United States Patent [19]

Laws

[11] Patent Number: 6,035,367
[45] Date of Patent: Mar. 7, 2000

[54] COMPUTER FILE SYSTEM PROVIDING LOOPED FILE STRUCTURE FOR POST-OCCURRENCE DATA COLLECTION OF ASYNCHRONOUS EVENTS

[75] Inventor: Richard Laws, Bedford, Mass.

[73] Assignee: Avid Technology, Inc., Tewksbury, Mass.

[21] Appl. No.: 08/835,104

[22] Filed: Apr. 3, 1997

[51] Int. Cl.$^7$ .......................... G06F 12/00; G11B 27/34
[52] U.S. Cl. .......................... 711/100; 707/205; 386/124
[58] Field of Search ...................... 360/54, 7, 8; 711/110, 711/100; 707/100, 200, 205; 369/60, 7; 386/52, 124; 348/714

[56] References Cited

U.S. PATENT DOCUMENTS

| | | | |
|---|---|---|---|
| 3,594,513 | 7/1971 | Greenberg et al. | 360/13 |
| 4,139,903 | 2/1979 | Morrill, Jr. et al. | 364/900 |
| 4,285,483 | 8/1981 | Cipollone | 246/107 |
| 4,373,193 | 2/1983 | Haag et al. | 364/900 |
| 4,408,309 | 10/1983 | Kiesling et al. | 369/7 |
| 4,409,670 | 10/1983 | Herndon et al. | 364/900 |
| 4,480,317 | 10/1984 | Haag et al. | 364/900 |
| 4,633,331 | 12/1986 | McGrady et al. | 360/7 |
| 4,646,241 | 2/1987 | Ratchford et al. | 364/424 |
| 4,654,848 | 3/1987 | Noguchi | 371/20 |
| 4,835,736 | 5/1989 | Easterday | 364/900 |
| 4,891,715 | 1/1990 | Levy | 386/52 |
| 4,897,741 | 1/1990 | Inoue et al. | 360/7 |
| 4,982,390 | 1/1991 | Tanaka | 306/7 |
| 5,038,319 | 8/1991 | Carter et al. | 364/900 |
| 5,051,845 | 9/1991 | Gardner et al. | 386/52 |
| 5,056,056 | 10/1991 | Gustin | 364/900 |
| 5,067,130 | 11/1991 | Jackson | 371/22.1 |
| 5,241,428 | 8/1993 | Goldwasser et al. | 386/124 |
| 5,282,092 | 1/1994 | Wilhelms | 360/5 |
| 5,301,240 | 4/1994 | Stockum et al. | 382/100 |
| 5,329,320 | 7/1994 | Yifrach | 348/738 |
| 5,345,430 | 9/1994 | Moe | 369/7 |
| 5,371,551 | 12/1994 | Logan et al. | 369/60 |
| 5,431,161 | 7/1995 | Ryals et al. | 128/653.1 |

(List continued on next page.)

FOREIGN PATENT DOCUMENTS

| | | |
|---|---|---|
| 0 645 765 | 3/1995 | European Pat. Off. . |
| 2 286 282 | 8/1995 | United Kingdom . |
| WO 96 26600 | 8/1996 | WIPO . |
| WO 96/26601 | 8/1996 | WIPO . |

OTHER PUBLICATIONS

Sony MDS–JA50ES Minidisc Deck Manual, p. 15, 1996.
Woundenberg, E., "MDS–503 Initial Impressions" [Online] http://www.connact.com/~eaw/minidisc/503 user.html, Dec. 1998.

(List continued on next page.)

*Primary Examiner*—Eddie P. Chan
*Assistant Examiner*—Yamir Encarnacion
*Attorney, Agent, or Firm*—Wolf, Greenfield & Sacks, P.C.

[57] ABSTRACT

An operating system has a file system which supports writing data to a file in a logical loop of clusters of storage locations. Writing can be performed in looped or unlooped modes, and a transition between looping and non-looped recording may be supported. Recording prior to occurrence of an asynchronous event is performed in a looped mode. After occurrence of the asynchronous event, the data collected in the looped portion is seamlessly merged with subsequently collected data by manipulation of pointers to the clusters by the operating system. By providing such a general structure for use in a file system of a computer, a substantially larger amount of memory is available for looped recording. In fact, several minutes of full motion broadcast quality video may be captured. In addition, by using the file system to handle the storage of data, an application does not need to arrange recorded information on a physical recording medium. Such a file system may be used in any application which collects data for the purpose of capturing the occurrence of an asynchronous event. Such applications include, but are not limited to, motion video recording, surveillance, test data collection, and other types of systems that need to record events that precede some arbitrary "trigger" condition and which may require a large amount of storage.

28 Claims, 8 Drawing Sheets

U.S. PATENT DOCUMENTS

| | | | |
|---|---|---|---|
| 5,533,193 | 7/1996 | Roscoe | 714/39 |
| 5,633,837 | 5/1997 | Gantt | 369/7 |
| 5,636,360 | 6/1997 | Courts et al. | 711/145 |
| 5,701,383 | 12/1997 | Russo et al. | 360/7 |
| 5,829,005 | 10/1998 | Senator | 707/205 |
| 5,845,240 | 12/1998 | Fielder | 704/201 |

OTHER PUBLICATIONS

"Sony MDS–503" [Online] http://www.connact.com/~eaw/minidisc/part Sony MDS–503.html, Dec. 1998.

"MDS–503" [Online] [Online] http://www.jyu.fi/minidisc/mds–503.html, Dec. 1998.

"Sony MDS–JA50ES" [Online] http://www.jyu.fi/minidisc/part Sony MDS–JA50ES.html, Dec. 1998.

"Sony MDS–JA50ES MiniDisc Deck" [Online] http://www.jyu.fi/minidisc/ja50es.html, Dec. 1998.

Hochguertel, G., "Nonlineare Aufzeighnung Mit Festplatten—Camcorder," Fernesh Und Kinotechnik, vol. 50, No. 10, Oct. 1996, pp. 578–582.

Fasciano, P., "Camcutter—Pictures Direct From Lens to Disk," Image Technology (Journal of the BKSTS), vol. 78, No. 9 Oct. 1996, pp. 16–18 and 20.

Gardner, L.J., et al., "A Closed–Loop Digital Video Editing System," SMPTE Journal, vol. 99, No. 8, Aug. 1, 1990, pp. 634–638.

Rose, J. "Re: Computer Radio Tuners/Recorders", Jul. 4, 1995 [Online] news://rec.radio.broadcasting.

Weatherboy, "Computer Radio Tuners/Recorders", Jul. 1, 1995 [Online] news://rec.radio.broadcasting.

"Audio Rock–It Pro", May 20, 1999 [Online] http://adstech.com/Products/Audio Rock It.html.

| LC_ENABLE | BOOLEAN | 100 |
| LC_REQ_LENGTH | INTEGER | 102 |
| LC_ACTUAL_LENGTH | INTEGER | 104 |

| FD_LOOPACTIVE | BOOLEAN | FALSE | 106 |
| FD_LOOPOFFSET | INTEGER | 0 | 108 |
| FD_LOOPLENGTH | INTEGER | 0 | 110 |
| FD_LOOPCOUNT | INTEGER | 0 | 112 |
| FD_LASTCLUSTBEFLOOP | INTEGER | 0 | 114 |
| FD_UNWRAPCLUSTER | INTEGER | 0 | 116 |
| FD_LASTCLUSTINLOOP | INTEGER | 0 | 118 |

```
LOCAL STATUS    dosFSIoct1
    (
    FAST DOS_FILE_DESC  *pDosFd    /* file descriptor of file to control */
    int                 function    /* function code    */
    int                 arg         /* some argument */
    )
    {
        .
        .
        .
        /* Perform requested function */
        switch (function)
            {
                .
                .
                .
                case FIOLOOPCONTROL:
                    retValue = dosFsLoopControl (pDosFd,
                    (DOS_LOOP_CONTROL *) arg ;
                    break;
                .
                .
                .
            }
        .
        .
        .
        return status;
    }
```

FIG. 8

COMPUTER FILE SYSTEM PROVIDING LOOPED FILE STRUCTURE FOR POST-OCCURRENCE DATA COLLECTION OF ASYNCHRONOUS EVENTS

FIELD OF THE INVENTION

The present invention is related to the recording of live information. More particularly, the present invention is related to the recording of an asynchronous event after the event occurs.

BACKGROUND OF THE INVENTION

A particular problem in the recording of live information, i.e., the recording of events as they actually happen, is that a particular event of interest might occur without being recorded. For example, in videography, a videographer might monitor a location, such as a courthouse door, with hopes of capturing an event, such as the exit of a particular person. There are two primary reasons why such an event might not be captured by the videographer. First, the videographer might not start recording in time to capture the event. Second, the videographer might be recording, but might have to stop recording if no more media is available and a change to new media is not completed before the event occurs.

One mechanism has been suggested to solve this problem, and is illustrated in PCT Publication No. WO 96/26600. This publication describes a motion video camera which records video and audio media temporarily in a ring buffer. The data is written continuously to the ring buffer, and the ring buffer contents are overwritten, until the camera is triggered to end looped recording. The contents of the ring buffer are appended to a file which is subsequently recorded in a normal, linear recording mode. A form of buffer also is used in fault detection systems such as flight data recorders, shown in U.S. Pat. Nos. 4,409,670 and 5,056,056, and 4,646,241, and logic analyzers, shown in U.S. Pat. Nos. 4,373,193 and 4,139,903.

Maintaining data in a buffer and saving this data when a particular event occurs has several problems. First of all, a typical buffer is usually implemented in integrated circuit memory and thus usually holds only a few megabytes of data. Such a small buffer is insufficient for use in recording asynchronous motion video events. Second, using such a buffer requires an application to control the use of the buffer and the relationship of the data to any subsequently recorded data.

SUMMARY OF THE INVENTION

The present invention provides an operating system having a file system which supports writing data to a file in a logical loop of clusters of storage locations. Writing can be performed in looped or unlooped modes, and a transition between looping and non-looped recording may be supported. Recording prior to occurrence of an asynchronous event is performed in a looped mode. After occurrence of the asynchronous event, the data collected in the looped portion is seamlessly merged with subsequently collected data by manipulation of pointers to the clusters by the operating system. By providing such a general structure for use in a file system of a computer, a substantially larger amount of memory is available for looped recording. In fact, several minutes of full motion broadcast quality video may be captured. In addition, by using the file system to handle the storage of data, an application does not need to arrange recorded information on a physical recording medium.

Such a file system may be used in any application which collects data for the purpose of capturing the occurrence of an asynchronous event. Such applications include, but are not limited to, motion video recording, surveillance, test data collection, and other types of systems that need to record events that precede some arbitrary "trigger" condition and which may require a large amount of storage.

Accordingly, one aspect of the present invention is an operating system for a computer which provides a file system through which files containing data are made accessible to application programs. A mode of writing to a file may be enabled wherein data is written in a continuous loop of clusters. Data is thereafter written to the file in a looped mode, wherein a loop has a specified length. When the amount of data written to the file is greater than the loop length, the data is still written into clusters within the loop. When looped writing is disabled, the file is reconstructed into a linear sequence of clusters when looped writing is disabled.

There are numerous other aspects and embodiments of the present invention, including but not limited to a motion video camera having such an operating system, as well as the computer-implemented processes of creating, writing to and reconstructing such looped files. The present invention also may be embodied in computer program products or digital information products for distribution.

BRIEF DESCRIPTION OF THE DRAWING

FIG. 8 is pseudocode describing modifications to an "ioctl" function in the DOS operating system in accordance with one embodiment of the present invention;

DETAILED DESCRIPTION

Figure 1:
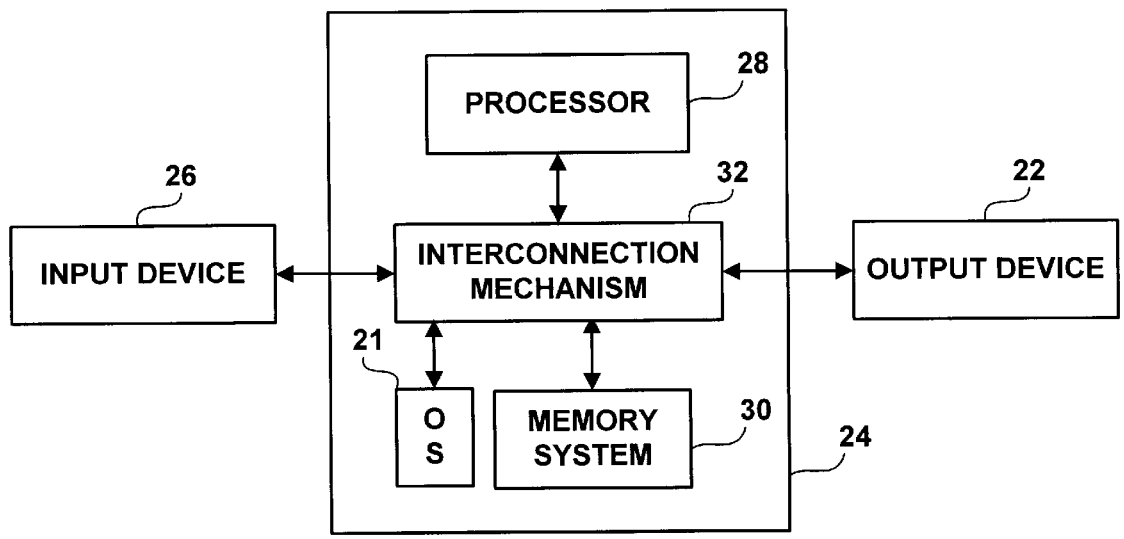
FIG. 1 is a block diagram describing a general purpose computer system with which the present invention may be used.

The present invention will be more completely understood through the following detailed description which should be read in conjunction with the attached drawing in which similar reference numbers indicate similar structures.

The file system of a computer is the mechanism by which an operating system manages files. A file is a named logical construct which is defined and implemented by the operating system to map the name and a sequence of logical records of data to physical storage media. An operating system may specifically support various record types or may leave them undefined to be interpreted or controlled by application programs. A file is referred to by its name by application programs and is accessed through the operating system using commands defined by the operating system. An operating system provides basic file operations for creating a file, opening a file, writing a file, reading a file and closing a file.

In order to create a file, the operating system first identifies space in the storage media which is controlled by the file system. An entry for the new file is then made in a directory which includes entries indicating the names of the available files and their locations in the file system. Creation of a file may include allocating certain available space to the file. Opening a file returns a handle to the application program which it uses to access the file. Closing a file invalidates the handle.

In order to write data to a file, an application program issues a command to the operating system which specifies both an indicator of the file, such as a file name, handle or other descriptor, and the information to be written to the file. Given the indicator of the file, the operating system searches the directory to find the location of the file. The directory entry stores a pointer, called the write pointer, to the current end of the file. Using this pointer, the physical location of the next available block of storage is computed and the information is written to that block. The write pointer is updated in the directory to indicate the new end of the file.

In order to read data from a file, an application program issues a command to the operating system specifying the indicator of the file and the memory locations assigned to the application where the next block of data should be placed. The operating system searches its directory for the associated entry given the indicator of the file. The directory may provide a pointer to a next block of data to be read, or the application may program or specify some offset from the beginning of the file to be used.

A primary advantage of using a file system is that, for an application program, the file is a logical construct which can be created, opened, written to, read from and closed without any concern for the physical storage used by the operating system.

Most physical media have a minimum unit size of storage, called a sector or block, to which data may be written or from which data may be read. Typically, a one dimensional block number is used to represent a sector, which is converted to a surface, track and sector within a track using a well known formula in order to access the sector. A block is 'used' if it is part of a file. Blocks may be used alone or in groups called clusters. As used herein the term cluster means one or more blocks, which are 'free' if they are available for writing and inclusion within a file. The free space may be represented in many ways, such as by a linked list or table or array. There are three primary methods for allocating disk space: contiguous allocation, linked allocation, and indexed allocation. In one embodiment of the present invention, the file system that is modified is the MS-DOS file system which uses a file allocation table. The following description uses such an allocation method as an example implementation. However, it should be understood that other allocation methods also may be used.

In one embodiment of the present invention, the operating system provides support for looped and unlooped writing to a data file by controlling how data is written to the data file. In particular, as data is written to the file, the operating system writes data to the same loop of blocks over and over again, periodically overwriting the same blocks. This looped recording is implemented by controlling a write pointer based on the current location at which data is being written and the desired size of the loop. Upon the occurrence of a triggering event, such as, for example, by a user pressing a button, the link from the currently written data block to the next data block is broken and additional data blocks are allocated that are not part of the looped linked list but are from previously unallocated storage. When the looped mode is disengaged or when the file is closed, the file allocation table is modified by the operating system to indicate the actual structure of the resulting data file.

One embodiment of the present invention will now be described in more detail with the following figures. Referring now to FIG. 1, a suitable computer system 20 on which the present invention may be implemented, typically includes an output device 22 which displays information to a user. The computer system 20 includes a main unit 24 connected to the output device 22 and an input device 26, such as a keyboard. The main unit 24 generally includes a processor 28 connected to a memory system 30 via an interconnection mechanism 32. The input device 26 also is connected to the processor 28 and memory system 30 via the connection mechanism 32, as is the output device 22.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, audio input and scanner. It should be understood the invention is not limited to the particular input or output devices used in combination with the computer system or to those described herein.

The computer system 20 typically is a general purpose computer system which is programmable using a high level computer programming language, such as "C, or "Pascal" to produce application programs. The computer system may also be specially programmed, special purpose hardware. In a general purpose computer system, the processor is typically a commercially available processor, of which the series x86 processors, available from Intel, and the 680X0 series microprocessors available from Motorola are examples. Many other processors are available. In the computer system the processor executes a program called an operating system 21, of which UNIX, DOS and VMS are examples, which controls the execution of other computer programs and provides a file system, scheduling, debugging, input/output control, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the processor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system 20 may be a multiprocessor computer system or may include multiple computers connected over a computer network. The file system is not limited to magnetic disks, but may include other storage such as optical disks, or even memory-based files, such as RAM drives.

As described above, the operating system provides a file system, i.e., logical constructs and associated commands, that provide a layer of abstraction between application programs and how data is physically stored on a storage medium in the memory system. A file is represented by a name, used by an application, which the operating system maps to storage locations. From the standpoint of an application program, a file may be opened and written to, put into a loop mode at some arbitrary point in time, and data is written to the file as if it had infinite storage with the file system handling looping within the file. At some point in time the file is reverted to a linear access mode when a certain event occurs, and additional data is written to newly allocated disk space. The loop mode may be re-enabled and disabled again at any time. When writing to the file is complete, the file is closed. Within the file system, pointers are manipulated to hide from the application program the fact the file is looping on itself.

The mechanism to be described below can be implemented within any file system that uses a block allocation scheme, maintains an allocation table to assign specific blocks to a file and to track status of blocks, supports random access to blocks and has dynamic cluster or block allocation. For example, the present invention may be used in a motion video recorder, such as shown in PCT Application Ser. No. WO 9626600, hereby incorporated by reference, which may use a version of the MS-DOS operating system, which is part of the VxWorks real time kernel from Wind River Systems, which is compatible with the MS-DOS 6.0 file system.

Figure 2:
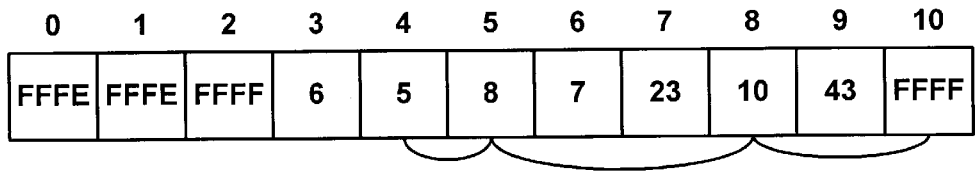
FIG. 2 is a diagram illustrating, by way of example, how files typically are allocated in the computer system of FIG. 1.

FIG. 2 illustrates how blocks or clusters within files generally are managed by an operating system. Typically, the operating system includes directory structure and a file allocation table (FAT). The directory indicates, for several subdirectories, the name of each file, and the corresponding block on disk which is the start of the data file. The FAT shows the blocks allocated to each file and how they are constructed into a chain of blocks to define the file contents. Example contents of blocks 0 through 10 are shown in FIG. 2. Assume, for example, that a file starts at block 4. The numbers within the blocks indicate the next block containing data of this file. As illustrated, this file includes the contents of blocks 4, 5, 8 and 10. 'FFFF' indicates the last block.

Figure 3:
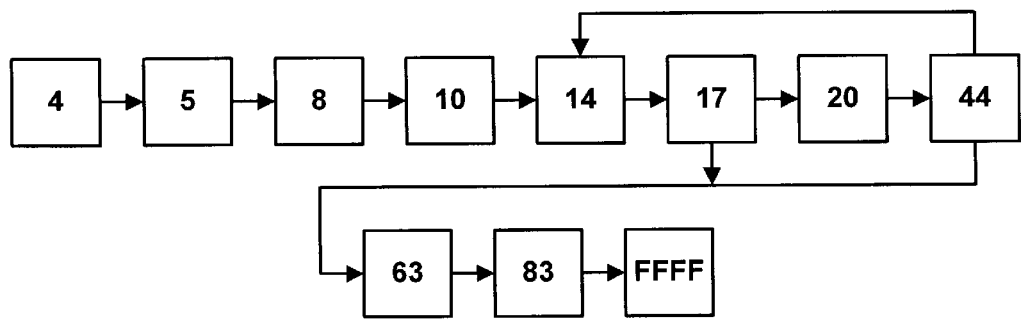
FIG. 3 is a diagram illustrating, by way of example, a file loop cluster chain in accordance with the invention.
Figures 4, 5, 6:
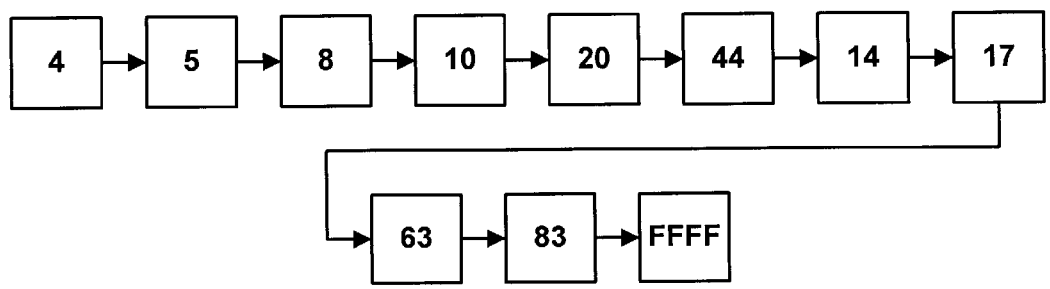
FIG. 4 is a diagram illustrating, by way of example, how a file loop cluster chain is unwrapped after loop mode is disengaged.
FIG. 5 is an illustration of a data structure used to represent file loop control information in one embodiment of the present invention.
FIG. 6 is an illustration of a partial data structure for a file descriptor that has been modified to support one embodiment of the present invention.

Referring now to FIG. 3, an example loop of clusters is shown. In this figure, the block number appears within the box representing the block. When looped control is instantiated, for example while data is being written to block 10, additional blocks are allocated while more data is written. When the amount of data written corresponds to the desired size of the loop, writing continues with the first block of the loop. In this example, block 14 follows block 10. Data is then written to blocks 17, 20 and 44. After data is written in block 44, writing continues with block 14 until an end of loop is requested by the application. If the application were, for example, to request unwrapping of the loop while writing a second time to block 17, data would then be written to block 63, followed by block 83. The looped pointer structure shown in FIG. 3 also would be unwrapped. Such unwrapping can occur at the time of the request, e.g., after writing to block 17, or when the data file is closed. The results of unwrapping this example looped data file are shown in FIG. 4. In particular, block 10 is followed by blocks 20, 44, 14 and 17, which are then followed by blocks 63 and 83.

In order to represent the control information used to implement a looped file structure, a data structure is added to the operating system called a loop control structure as shown in FIG. 5. This structure stores a value indicating whether a loop mode has been enabled, as indicated at 100, the requested loop length, as indicated at 102, and the actual loop length as indicated in 104. The actual length may differ from the requested length in order to accommodate for alignment of the requested size to actual block sizes.

In order to support the creation of looped writing and unwrapping of looped files after looped writing is terminated, the data structure of a file descriptor also has been modified to include several additional values, as shown in FIG. 6. FIG. 6 also illustrates these values as initialized. In particular, a loop active value 106 indicates the status of the looping mode of the file, and is initially false. The loop offset 108 indicates the offset of the loop within the file. The loop length 110 indicates the size of the loop, and is initially zero. The loop count 112 is initially zero, but is non-zero once looping has occurred. Another value 114 indicates the last cluster before the loop, which is initially zero. The cluster at which unwrapping occurs, called the unwrap cluster, also is stored at 116, and is initially zero. Finally, the last cluster in the loop 118 also is initially zero.

Figure 7:
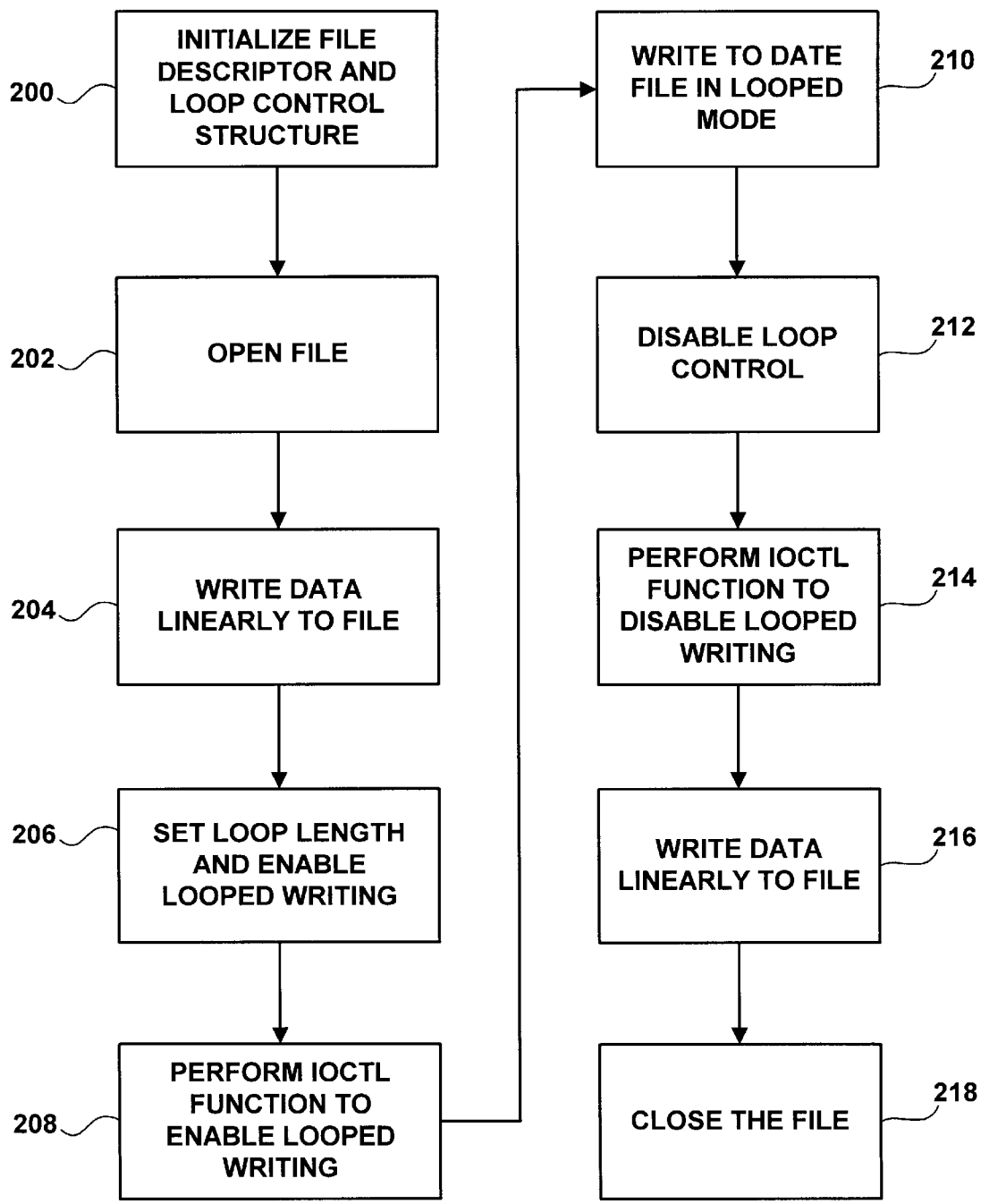
FIG. 7 is a flow chart describing how an application program typically would use the loop control functions of a file system in accordance with this embodiment of the present invention.

Referring now to FIG. 7, a flow chart describing how an application program would utilize looped recording will now be described. The application program first initializes variables, in step 200, corresponding to the file descriptor (FIG. 6) and the loop control structure (FIG. 5). The desired file then is opened in step 202 and a pointer to its first write location is obtained. It is possible that an application, for some period of time, may write data linearly to the file in step 204. Eventually, the application may set the variables (see FIG. 5) for controlling looped writing in step 206. These variables include the requested loop length 102 and setting the loop enable 100 to true. An "ioctl" function, described below, then is called in step 208 to place the desired file in looped recording mode. For some period of time, data may be written in step 210 to the loop in the file. When looped writing is to be terminated, the application sets the loop control enable value 100 to false in step 212 and disables the looping by applying the "ioctl" function in step 214. Data then can be written linearly to the data file in step 216. Eventually the data file is closed in step 218.

Referring now to FIG. 8, file loops are implemented as a special I/O system control function (commonly called "ioctl" in the DOS operating system and other systems) which is executed upon an open file pointer, such as indicated in step 208 of FIG. 7. An I/O control function is implemented as a special function code and one or more parameters are passed to the I/O system by means of a simple function call. The I/O control function code in this example is designated FIOLOOPMODE and is assigned a unique function code. This I/O control function passes a parameter to the file system which is the loop control structure of FIG. 5.

Example pseudocode for modifying of the ioctl function is shown in FIG. 8. The pseudocode of FIG. 8 indicates that this ioctl function receives a file descriptor of the file to control, a function code, which may indicate the loop control function, and an argument, which for the loop control function is the address in memory of the loop control structure (FIG. 5). The requested function is performed, in this instance, by a "case" switch based on the received function code, which calls a loop control function of the file system, described below in connection with FIGS. 9 and 10, as applied to the indicated file descriptor, and the loop control structure (FIG. 5) specified by the argument.

Figure 9:
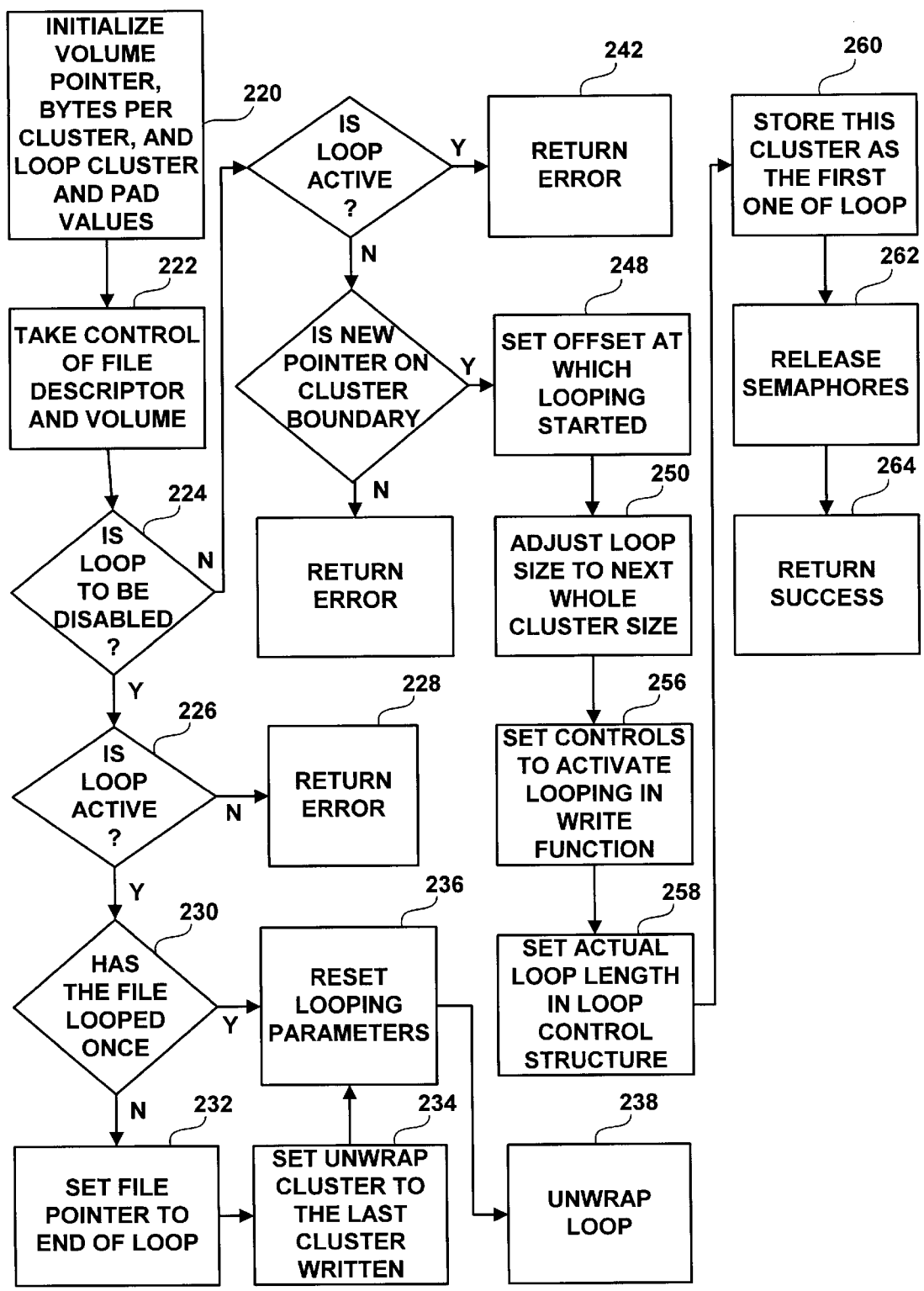
FIG. 9 is a flow chart describing an embodiment of a file loop control function.

The loop control function now will be described in connection with FIG. 9. The file loop control function begins by initializing in step 220. A loop pad and a loop cluster value, described below, are initialized to zero and a volume descriptor for the file descriptor is accessed to identify the number of bytes per cluster in this volume. Next, control of the file descriptor and volume is taken in step 222. This step may be performed, for example, by using semaphores. The file descriptor also may be checked to ensure that it is current and not deleted or obsolete. If the file descriptor is not current, the semaphores are released and an error may be returned.

Given proper initialization, if the loop control enable value 100 (FIG. 5) is set to false, as determined in step 224, then the loop active value 106 (FIG. 6) is checked to ensure that it is also not false (step 226). An error is returned in step 228 if the file is not in loop mode and a loop disable command is received. Any semaphores on the volume or file descriptor also are released in case of such an error.

If the file already has been looped at least once, its position information is recorded. More particularly, the loop count value is checked in step 230. If it is non-zero, then the file pointer is set to the end of the loop in step 232 by setting the file descriptor new pointer (not shown) to the sum of the loop offset and the loop length. The unwrap cluster value 116 is set to the file descriptor of the last cluster to which data was written in step 234. The loop active value 106 is then set to false in step 236 and the loop is unwrapped in loop step as is described in more detail below in connection with FIG. 10.

If the loop control enable value 100 is true, as determined in step 224, and if the loop active value 106 already is set to true as determined in step 240, an error is returned in step 242 indicating that the file already has been enabled for looping. If such an error occurs, any semaphores controlling the volume and file descriptor should be released. Otherwise, if the start offset is not on a cluster boundary, as determined in step 244, another error message may be returned in step 246, which also should result in the release of the volume and file descriptor semaphores. Step 244 may be performed by dividing the file descriptor's new pointer by the number of bytes per cluster, and checking if there is a remainder.

Next, the offset at which looping is started is set in step 248. This is performed by setting the loop offset value 108 of the file descriptor to the new pointer value. The loop size is then adjusted up to the next whole cluster size in step 250. In particular, the loop pad value is computed as the remainder of the requested length 102 divided by the number of bytes per cluster. The loop cluster initiated in step 220 value is set to the requested loop length divided by the number of bytes per cluster, without remainder. This value represents the number of clusters in the loop. If the number of clusters is zero or if the loop pad value is not equal to zero, the loop cluster value is incremented by one. Step 250 ensures that the number of clusters in the loop is at least one and is larger than the requested length of the loop.

Figure 11:
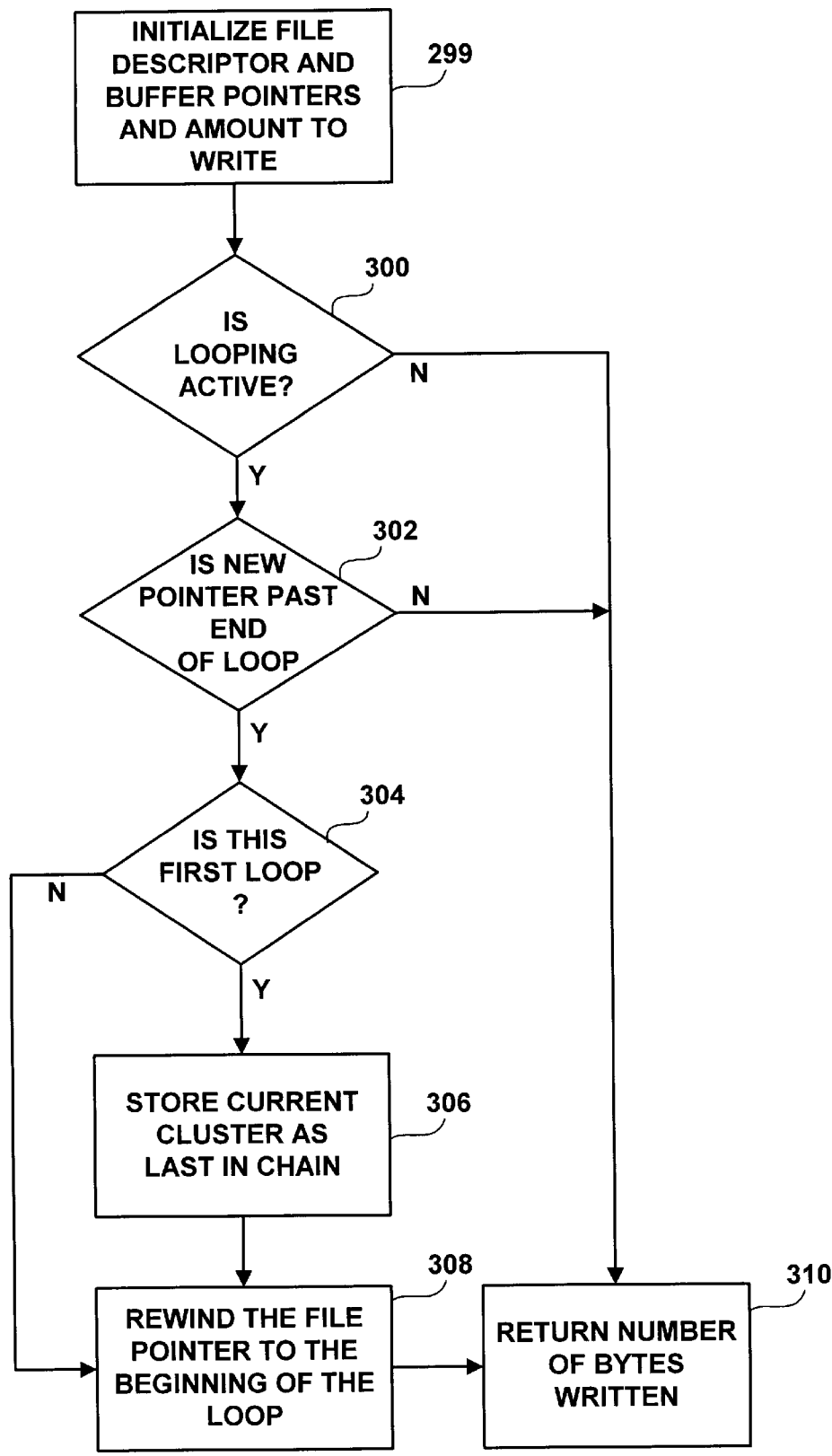
FIG. 11 is a flow chart describing how data is written to a looped segment to implement a looped write function in accordance with one embodiment of the present invention.

The loop active value 106 and loop length value 110 then are set in step 256 to activate looping during the write function, as will be described below in connection with FIG. 11. The actual loop length 104 then is set in step 258. An indication of the current cluster which is the last cluster before the loop is then stored in step 260. If the loop offset is zero, then this value 114 is set to zero. Otherwise, this value 114 is set to indicate the current cluster. Any semaphores then are released in step 262, which completes the ioctl function operation. Success is returned in step 264.

Figure 10:
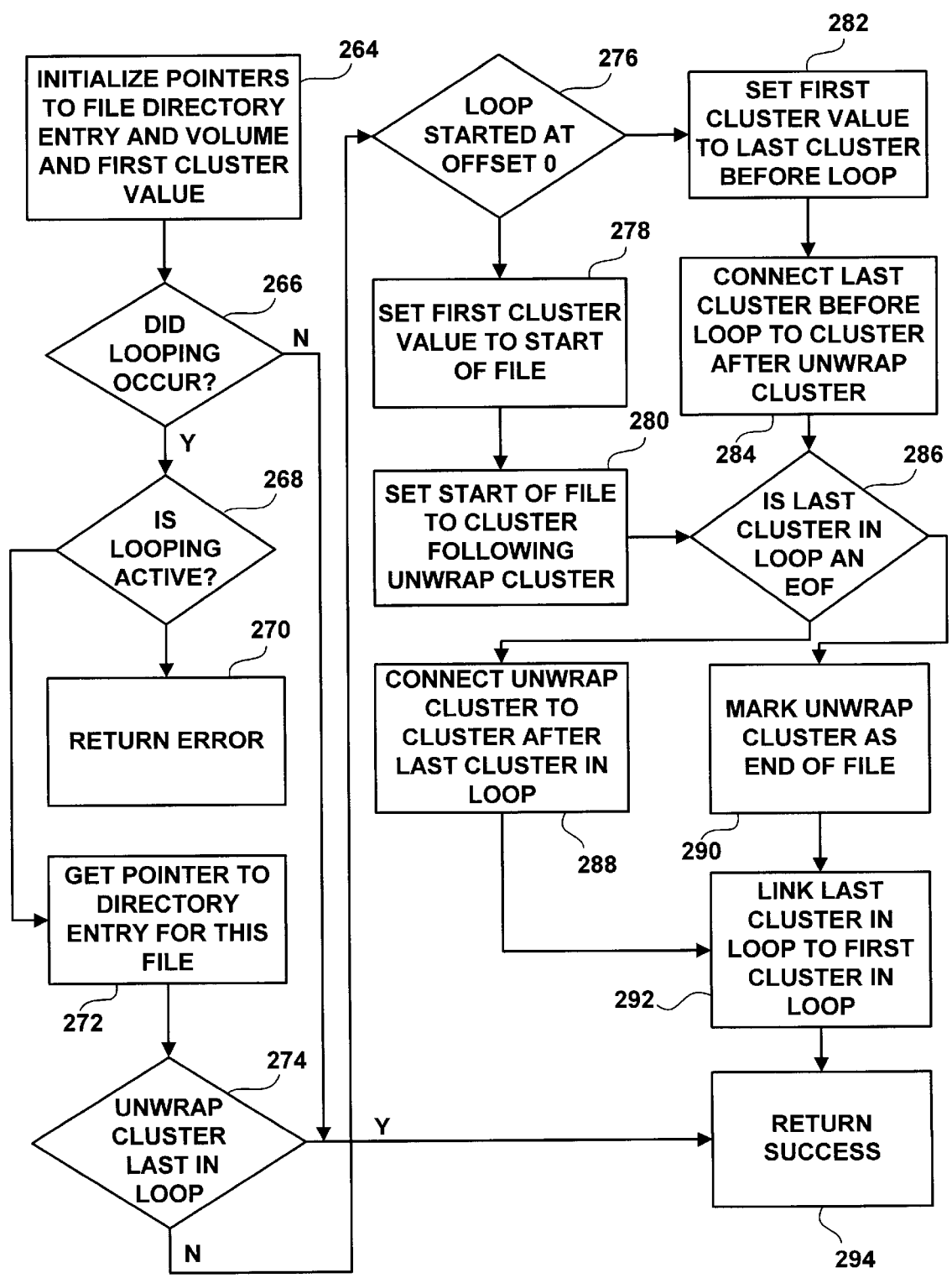
FIG. 10 is a flow chart describing an embodiment of an unwrap function for correcting file allocation and directory entries when looping of a file is disengaged.

The unwrap function which patches up the file allocation table and directory entry structure when a loop is disengaged, as called in step 238, will now be described in connection with FIG. 10. The unwrap process begins with some initialization in step 264. For example, some variables are initialized to obtain the pointer to the file's directory entry and the volume descriptor, which is obtained from the file descriptor, and to set an integer value representing the first cluster in the loop to zero. This value is called the first cluster value. Next, a file is unwrapped if looping actually occurred. Accordingly, the file descriptor loop counter 112 is checked in step 266. If looping did not occur, then process ends and success is returned in step 294. The loop active value 106 is checked in step 268. If this value indicates that looping is active, an error is returned in step 270.

If the loop counter is greater than zero, indicating looping occurred, and looping is no longer active, then the directory entry for the file is read in step 272. If the unwrap cluster 116 is the last cluster in the loop, as determined in step 274 by comparing value 116 to value 118, the process also ends in step 294. Otherwise, the file allocation table is modified as will now be described in connection with the remaining steps of FIG. 10. To correct the file allocation table, it is first determined whether the loop started at file offset zero, in step 276, by determining whether the last cluster before the loop, i.e., value 114 in the file descriptor, is equal to zero. If the start of the file is the first cluster in the loop then the first cluster value is set to a value indicating the cluster defining the start of the file, as obtained from the director entry in step 278. The directory entry then is modified to indicated that the next cluster in the file following the unwrap cluster 116, determined using the volume descriptor, is the new start of the file (step 280).

If the loop did not start at the file offset zero, i.e., the last cluster before loop value 114 is not equal to zero, the first cluster value is set in step 282 to be the next cluster, according to the volume descriptor, after the last cluster before loop value 114 of the file descriptor. A file allocation table entry is then written to connect the last cluster before the loop to the cluster after the unwrap cluster in step 284. For example, the cluster corresponding to value 114, and the next cluster after the unwrap cluster 116, determined using the volume descriptor, are linked in the file allocation table.

Next, the unwrap cluster 116 connected to the first cluster in any post-loop segment. In particular, if the next cluster after the last cluster in the loop 118 is not null, determined using the volume descriptor in step 286, a file allocation table entry is written to link the unwrap cluster 116 to the next cluster after the last cluster in the loop 118 (step 288). If the volume descriptor does not indicate a cluster following the last cluster in the loop 118, the unwrap cluster is the end of the file. Accordingly, a file allocation table entry is written indicating that the end of file occurs after the unwrap cluster 116 (step 290). Finally, the last cluster in the loop 118 is linked to the cluster corresponding to the first cluster value in step 292, by writing a file allocation table entry. After these steps are completed, the unwrap function returns successfully in step 294.

Having now described example ioctl functions, how the actual writing of data causes looping back to a first block in a loop now will be described. This looping functionality is implemented in the file system's write function. The write function includes inputs indicating the file descriptor pointer, a pointer to a buffer indicating the data to be written, and an integer representing the number of bytes to write (step 299). In the process of writing data, in addition to performing standard functionality, also it is determined whether the loop is active in step 300 by analyzing the loop active field 106 of the file descriptor data structure. If the new pointer for the file descriptor is not within the clusters allocated for the loop, as determined in step 302, this condition indicates that looping should occur. If the current value of the loop counter 112 is zero, this loop is the first loop and the loop count 112 is incremented (step 304). If this is the first loop, an indication of this cluster is stored as the last cluster in the loop 118 in step 306. The file pointer is rewound in step 308 by setting the new pointer for the file descriptor to the loop offset pointer 108. The writing process can then continue to write data in step 310 using the rewound file pointer.

Figure 12:
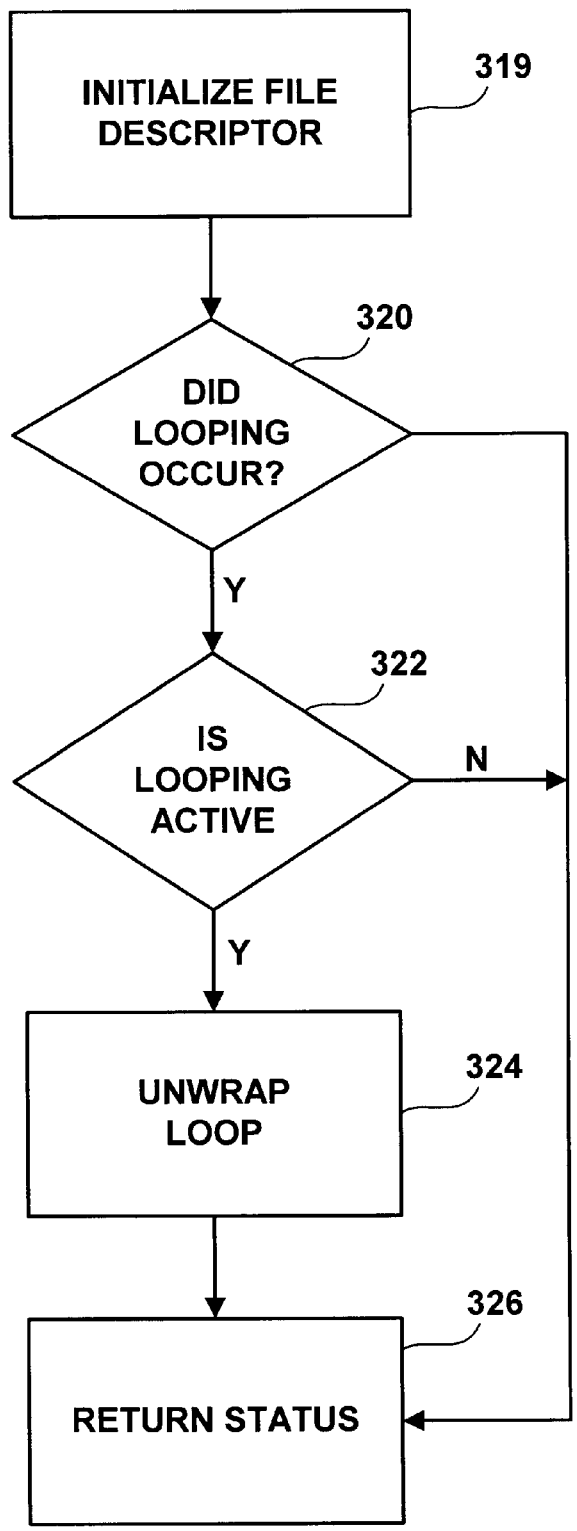
FIG. 12 is a flow chart describing how a file is closed to ensure that file allocation table entries for a file with a loop have been unwrapped.

As described above, the ioctl functions of FIGS. 9 and 10 handle the unwrapping of the looped file allocation table entries when the mechanism is engaged. However, it may be desirable to ensure that these entries have been unwrapped when the file is closed. Accordingly, as will now been described in connection with FIG. 12, the standard close function can be modified. After initializing the file descriptor value in step 319, the loop counter is examined in step 320. If it is non-zero, indicating that looped writing had occurred, then the loop active field is examined in step 322. If the loop is active, the loop is then unwrapped in step 324 (using the process of FIG. 10) and the loop active value 106 is reset. The close function can then return its status in 326.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. An operating system for a computer system having a memory system having a plurality of logic blocks of memory storage locations, the operating system providing a file system through which at least one file containing data is made accessible to at least one application program, the operating system comprising:

means for mapping a first file of the at least one file to a first two or more loop blocks of a plurality of blocks;

means for enabling a loop mode of writing to the first file wherein data is written in a continuous loop of the first loop blocks;

means for detecting one or more triggering events;

means for disabling the loop mode in response to a first triggering event;

means for enabling a linear sequence mode of writing to the first file, wherein the means for enabling the linear sequence mode is evoked responsive to the first triggering event; and means for constructing the first file into a linear sequence of blocks when the loop mode is disabled.

2. The operating system of claim 1, wherein:

the data comprises media data.

3. The operating system of claim 1, wherein:

the first loop blocks have a total actual loop length, and the operating system further comprises:

means for receiving a requested loop length, and means for providing that the total actual loop length is at least as great as the requested loop length.

4. The operating system of claim 3, wherein:

the requested loop length is user-selected.

5. The operating system of claim 1, in combination with a motion video recorder.

6. An operating system for a computer system having a memory system having a plurality of logic blocks of memory storage locations, the operating system providing a file system through which at least one file containing data is made accessible to at least one application program, the operating system comprising:

means for mapping a first file of the at least one file to a first two or more loop blocks of a plurality of blocks;

means for enabling a loop mode of writing to the first file wherein data is written in a continuous loop of the first loop blocks;

means for detecting one or more triggering events;

means for disabling the loop mode in response to a first triggering event; and means for enabling a linear sequence mode of writing to the first file, wherein the means for enabling the linear sequence mode is evoked responsive to the first triggering event; and means for constructing the first file into a linear sequence of blocks when the loop mode is disabled and the linear sequence mode is enabled.

7. The operating system of claim 6, wherein:

the means for reconstructing comprises means for determining a last loop block that is the last of the first loop blocks into which data is written prior to disabling the loop mode, means for determining a first non-loop block that is the first block into which data is written subsequent to enabling the linear sequence mode and that is not a loop block, and means for mapping the first file to the last loop block and the first non-loop block so that, in the first file, data in the first non-loop block logically sequentially follow immediately after data in the last loop block.

8. The operating system of claim 7, wherein:

the means for reconstructing further comprises means for mapping the first file to each of the first loop blocks so that, in the first file, data in the first loop blocks logically sequentially follow according to an order in which data was written to the first loop blocks, and means for mapping the first file to one or more sequential non-loop blocks, if any, into which data is written subsequent to the writing of data to the first non-loop block so that, in the first file, data in the one or more sequential non-loop blocks logically sequentially follow according to an order in which data was written to them.

9. The operating system of claim 8, further comprising:

means for disabling the linear sequential mode in response to a second triggering event;

means for mapping the first file to a second two or more loop blocks of the plurality of blocks not already mapped to the first file; and means for re-enabling the loop mode of writing to the first file wherein, responsive to the second triggering event, data is written in a continuous loop of the second loop blocks.

10. A method for providing looped and unlooped writing to at least one file of a file system provided by a computer operating system operating on a computer system having a memory system having a plurality of logic blocks of memory storage locations, the at least one file containing data and being accessible to at least one application program, the method comprising the steps of:

mapping a first file of the at least one file to a first two or more loop blocks of the plurality of blocks;

enabling the loop mode of writing to the first file wherein data is written in a continuous loop of the first blocks;

detecting one or more triggering events;

disabling the loop mode in response to a first triggering event;

enabling a linear sequence mode of writing to the first file; and reconstructing the first file into a linear sequence of blocks when the loop mode is disabled.

11. The method of claim 10, wherein:

the data comprises media data.

12. The method of claim 10, wherein:

the first loop blocks have a total actual loop length, and the method further comprises the steps of:

receiving a requested loop length, and providing that the total actual loop length is at least as great as the requested loop length.

13. The method of claim 10, wherein:

the step of enabling a linear sequence mode is taken response to the first triggering event.

14. A method for providing looped and unlooped writing to at least one file of a file system provided by a computer operating system operating on a computer system having a memory system having a plurality of logic blocks of memory storage locations, the at least one file containing data and being accessible to at least one application program, the method comprising the steps of:

mapping a first file of the at least one file to a first two or more loop blocks of the plurality of blocks;

enabling the loop mode of writing to the first file wherein data is written in a continuous loop of the first blocks;

detecting one or more triggering events;

disabling the loop mode in response to a first triggering event;

enabling a linear sequence mode of writing to the first file; and reconstructing the first file into a linear sequence of blocks when the loop mode is disabled and the linear sequence mode is enabled.

15. The method of claim 14, wherein:

the step of reconstructing comprises the steps of determining a last loop block that is the last of the first loop blocks into which data is written prior to disabling the loop mode, determining a first non-loop block that is the first block into which data is written subsequent to enabling the linear sequence mode and that is not a loop block, and mapping the first file to the last loop block and the first non-loop block so that, in the first file, data in the first non-loop block logically sequentially follow immediately after data in the last loop block.

16. The method of claim 15, wherein:

the step of reconstructing further comprises the steps of mapping the first file to each of the first loop blocks so that, in the first file, data in the first loop blocks logically sequentially follow according to an order in which data was written to the first loop blocks, and mapping the first file to one or more sequential non-loop blocks, if any, into which data is written subsequent to the writing of data to the first non-loop block so that, in the first file, data in the one or more sequential non-loop blocks logically sequentially follow according to an order in which data was written to them.

17. The method of claim 16, further comprising the steps of:

disabling the linear sequential mode in response to a second triggering event;

mapping the first file to a second two or more loop blocks of the plurality of blocks not already mapped to the first file; and re-enabling the loop mode of writing to the first file wherein, responsive to the second triggering event, data is written in a continuous loop of the second loop blocks.

18. A computer system comprising:

a central processing unit;

an operating system that provides a file system having at least one file; and at least one memory stored system having stored therein a set of application instructions for execution of an application program by the central processing unit in cooperation with the operating system, the memory system also having a plurality of logical blocks of memory storage locations; wherein:

the file system supports writing data to at least one file and a continuous logical loop of a first plurality of loop blocks of the plurality of logical blocks having a first loop length, wherein the data is accessible to the application program; and wherein the file system further supports writing data to the at least one file in a logical linear sequence of one or more of a first set of non-loop blocks of a plurality of logical blocks comprised of blocks that are now loop blocks, wherein the data in the first set of non-loop blocks is accessible to the application program;

wherein prior to occurrence of the first synchronous event, the file system provides that data is written to the first plurality of loop blocks, and responsive to occurrence of the first asynchronous event, the file system provides that data is written to the first set of non-loop blocks and further provides that the data written to the first plurality of loop blocks is logically sequentially linked with data written to the first set of non-loop blocks in an order in which the data was written so that those of the first plurality of loop blocks into which data was written, and those of the first set of non-loop blocks into which data was written, are reconstructed into a linear sequence of blocks accessible to the application program by accessing the file.

19. The computer system of claim 18, wherein:

the file system provides the sequential linking by manipulation of pointers to at least one of the first plurality of loop blocks and at least one of the first set of non-loop blocks.

20. The computer system of claim 18, wherein:

responsive to an occurrence of a second asynchronous event, the file system provides that data is written to a second plurality of loop blocks of the plurality of logical blocks or memory storage locations that do not comprise any of the first plurality of loop blocks into which data has been written or any of the first set of one or more non-loop blocks into which data has been written.

21. The computer system of claim 20, wherein:

responsive to an occurrence of a third asynchronous event, the file system provides that data is written to a second set of one or more non-loop blocks that do not comprise any of the first or second pluralities of loop blocks into which data has been written or any of the first set of one or more non-loop blocks into which data has been written.

22. The computer system of claim 18, wherein:

the data comprises media data.

23. The computer system of claim 18, wherein the computer system is integrated in a motion video recorder.

24. A computer program product for use with a computing system having an operating system that provides a file system having at least one file containing data and being accessible to at least one application program, the computing system further having at least one memory storage system having a plurality of logical blocks of memory storage locations, the computer program product comprising a computer usable medium having embedded therein computer readable program code method steps comprising:

mapping a first file of the at least one file to a first two or more loop blocks of the plurality of blocks;

enabling a loop mode of writing to the first file wherein data is written in a continuous loop of the first loop blocks;

detecting one or more triggering events;

disabling the loop mode in response to a first triggering event;

enabling a linear sequence mode of writing to the first file; and reconstructing the first file into a linear sequence of blocks when the loop mode is disabled.

25. The computer program product of claim 24, wherein:

the data comprises media data.

26. The computer program product of claim 24, wherein:

the step of enabling a linear sequence mode is taken responsive to the first triggering event.

27. The computer program product of claim 24, wherein the computer program product is used by a motion video camera.

28. A method for providing looped and unlooped writing to at least one file of a file system provided by a computer operating system having an I/O system, the operating system operating on a computer system having a central processing unit (CPU) and a memory system having a plurality of logical blocks of memory storage locations, the memory system having stored therein a set of application instructions for execution of an application program by the CPU in cooperation with the operating system, the at least one file containing data and being accessible to the application program, the method comprising:

initializing a loop control data structure comprising
a first value indicating a user-requested length of the first loop, and
a second value indicating an actual length of the first loop determined to be at least as great as the user-requested length;

opening the at least one file;

determining a first block of the at least one file that is a first write location;

implementing an I/O system control function comprising passing the first and second values of the loop control data structure to the I/O system; and activating a loop control function of the file system that, based on the first write location and the loop control data structure, enables writing to the first loop.

* * * * *